April 15, 1947. G. E. DATH Re. 22,867

RAILWAY CAR TRUCK

Original Filed May 4, 1944

Inventor
George E. Dath

By Henry Fuchs.
Atty.

Reissued Apr. 15, 1947

Re. 22,867

UNITED STATES PATENT OFFICE 22,867

RAILWAY CAR TRUCK

George E. Dath, Mokena, Ill., assignor to W. H. Miner, Inc., Chicago, Ill., a corporation of Delaware Original No. 2,390,206, dated December 4, 1945, Serial No. 534,039, May 4, 1944. Application for reissue June 7, 1946, Serial No. 674,942

6 Claims. (Cl. 105—197)

This invention relates to improvements in railway car trucks.

One object of the invention is to provide in a railway car truck, simple and efficient means for snubbing the action of the usual truck springs, including spring pressed friction plates which are carried by the truck bolster and have sliding frictional engagement with the truck side frames.

Another object of the invention is to provide a snubbing means of the character set forth in the preceding paragraph which also functions to yieldingly control lateral relative motion of the truck bolster and side frames of the truck.

Other objects of the invention will more clearly appear from the description and claims hereinafter following.

Figure 1:
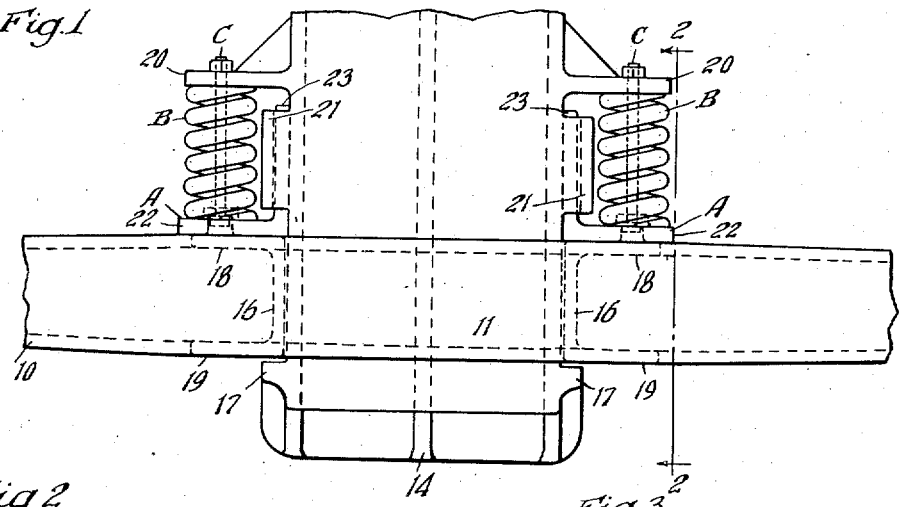
Figure 2:
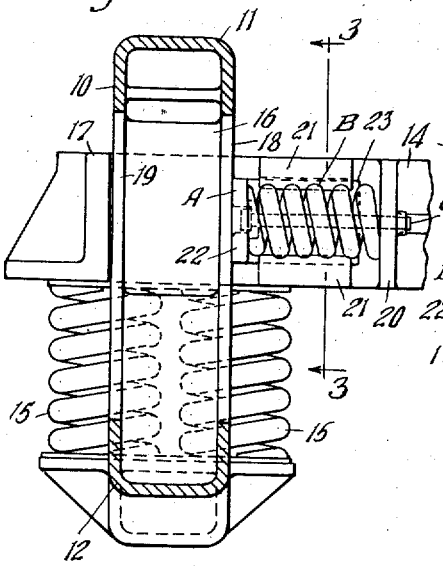
Figure 3:
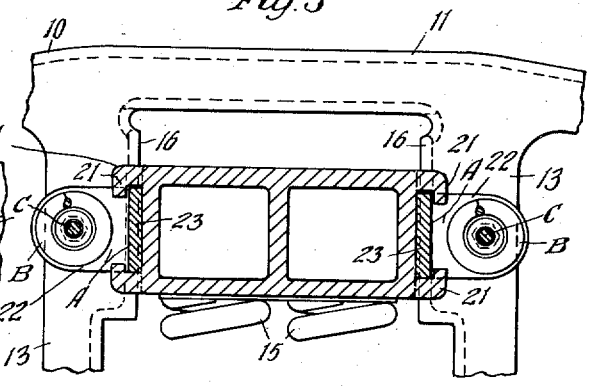

In the drawing forming a part of this specification, Figure 1 is a top plan view of a portion of one of the side frames of a railway car truck and a portion of the associated truck bolster, illustrating my improvements in connection therewith. Figure 2 is a transverse, vertical sectional view, corresponding substantially to the line 2—2 of Figure 1. Figure 3 is a longitudinal vertical sectional view, corresponding substantially to the line 3—3 of Figure 2.

In said drawing, 10 indicates one of the side frame members of a railway car truck which is in the form of a casting, and has top and bottom members 11 and 12 connected by vertically disposed sections 13—13. As will be understood by those skilled in this art, the railway car truck includes two such side frame members 10—10, a truck bolster 14, and two clusters of truck springs 15—15 which are supported on the bottom members 12—12 of the side frame. The opposite ends of the bolster are guided between the sections 13—13 of the side frames and the bolster is supported by the two clusters of truck springs. The truck bolster supports the usual body bolster of the car. As shown most clearly in Figure 2, the sections 13—13 are inwardly offset at the upper ends thereof to provide guides 16—16 which cooperate with guide seats 17—17 at the sides of the bolster 14, as shown in Figure 1. The vertical sections 13—13 of each side frame casting 10 include inner and outer webs 18 and 19 which, together with similar webs on the top and bottom members 11 and 12, form the inner and outer side walls of the casting. The web 18 of each side frame 10 presents a vertically disposed, flat surface which is utilized as a friction surface in my improvements.

My improved snubbing means comprises broadly a pair of angular or L-shaped friction plates A—A carried by the truck bolster at each end thereof; springs B—B yieldingly pressing the plates at each end of the bolster against the inner side of the corresponding side frame of the truck; and retainer bolts C—C.

In carrying out my invention, I provide laterally outwardly projecting spring abutment flanges 20—20 on the bolster 14 at opposite sides of each end of the same, the flanges at one end of the bolster being illustrated in the drawing. The flanges 20—20 are spaced inwardly from the corresponding side frame 10, as most clearly shown in Figure 1, are in transverse alignment, and lie in a vertical plane.

At each side, at the top and bottom edges thereof, the bolster 14 is provided with top and bottom, angular guide flanges 21—21 extending lengthwise of the bolster and disposed between the flanges 20—20 and the corresponding side frame 10. The flanges 21—21 provide channel guideways for the friction plates A—A, as hereinafter described.

The friction plates A—A, which are of L-shaped form, are arranged at opposite sides of the bolster and each plate comprises a portion 22 which forms the friction plate proper, and a portion 23 at right angles to said plate 22, which forms a guide member. The guide member 23 is slidingly guided in the guideway provided by the guide flanges 21—21 and has movement in horizontal direction. The friction plate portion proper 22 contacts the side frame and is vertically slidable thereon, that is, has sliding engagement with the friction surface presented by the web 18 of the side frame.

The springs B—B are in the form of helical coils, one of said springs being associated with each friction plate. The spring B is interposed between the friction plate portion proper 22 of the friction plate A and the spring abutment 20 of the bolster. The friction plate A is anchored by the retainer bolt C, which extends through the portion 22 of said plate and the spring abutment flange 20. The spring B is under predetermined compression so as to press the friction plate against the side frame with substantially constant pressure.

As will be evident, up and down movement of the bolster 14 is frictionally resisted by the sliding frictional engagement between the spring pressed friction plates A—A and the side frames of the car truck, thus effectively snubbing the action of the truck springs both during compression and recoil thereof. Further, the lateral motion of the truck bolster is stabilized by the action of the springs C—C and C—C at opposite ends of the bolster, which springs act in opposite directions to yieldingly oppose lateral motion.

I have herein shown and described what I now consider the preferred manner of carrying out my invention, but the same is merely illustrative and I contemplate all changes and modifications that come within the scope of the claims appended hereto.

I claim:

1. In a railway car truck, the combination with truck side frames, a truck bolster, and springs supporting said bolster on the side frames; of vertically spaced guide slots on one side of said bolster at one end thereof, said guide slots extending lengthwise of the bolster; a friction plate having a section thereof extending lengthwise of the bolster and guided for lengthwise movement in said guide slots, said plate having a second section at right angles to said first named section bearing on the inner side of the corresponding side frame in sliding engagement therewith; a laterally extending spring abutment flange projecting from said side of the bolster rearwardly of said guide slots, said abutment flange being spaced inwardly from the corresponding side frame; and a spring under predetermined compression interposed between the second named section of the friction plate and said spring abutment flange.

2. In a railway car truck, the combination with truck side frames, a truck bolster, and springs supporting said bolster on the side frames; of pairs of lengthwise extending, vertically spaced guideways at opposite sides of the bolster at each end thereof; spring abutment flanges laterally projecting from the bolster at opposite sides of the same at each end thereof, said abutment flanges being at the inner ends of said guideways; friction plates at each end of the bolster at opposite sides thereof, each plate having a plate-like guide portion extending lengthwise of the bolster slidingly engaged in the guideways of the corresponding pair for movement lengthwise of the bolster, and a laterally projecting flange-like friction plate portion proper slidingly engaging the inner side of the side frame at the corresponding side of the bolster; and a spring under compression interposed between, and having its opposite ends bearing on, the friction plate portion proper of each friction plate and corresponding spring abutment.

3. In a railway car truck, the combination with truck side frames, a truck bolster, and springs supporting said bolster on the side frames; of top and bottom, lengthwise extending guide slots at opposite sides of the bolster at each end thereof; spring abutment flanges laterally projecting from the bolster at opposite sides of the same at each end thereof at the inner ends of said guide slots; friction plates at each end of the bolster at opposite sides thereof, each plate comprising two sections at right angles to each other, one of said sections forming a guide portion having its top and bottom edges slidingly engaged in the corresponding top and bottom guide slots of the bolster for movement lengthwise of the latter, and the other section thereof forming a friction plate portion, said last named portion slidingly engaging the inner side of the side frame at the corresponding side of the bolster; and a spring under compression interposed between, and having its opposite ends bearing on, the friction plate portion proper of each friction plate and corresponding spring abutment.

4. In a railway car truck, the combination with truck side frames, a truck bolster, and springs supporting said bolster on the side frames; of friction elements carried by the bolster at opposite sides of said bolster at each end thereof, each of said elements having a portion thereof extending lengthwise of the bolster, said lengthwise extending portion having top and bottom, horizontally disposed guide surfaces and vertically disposed guide surfaces on opposite sides thereof, each friction element having a flat friction surface at right angles to the length of the bolster in sliding frictional engagement with the corresponding side frame; laterally extending spring abutment walls on opposite sides of the bolster at each end thereof; spring means reacting between said friction elements and said abutment walls for pressing the friction elements against the side frames to hold the same in tight frictional contact with said side frames and to oppose lateral movement of the truck with respect to the bolster; and guide means at opposite sides of the bolster at each end thereof for guiding said friction elements lengthwise of the bolster, each guide means comprising spaced top and bottom walls and spaced side walls between which said lengthwise extending portion of the corresponding friction element is guided for horizontal movement lengthwise of the bolster.

5. In a railway car truck, the combination with truck side frames, a truck bolster, and springs supporting said bolster on the side frames; of a friction element carried by said bolster and having sliding engagement with one of said side frames, said friction element having a flat friction surface at right angles to the length of the bolster bearing on said side frame, said element having a portion thereof extending lengthwise of the bolster; a laterally projecting spring abutment on said bolster in alignment with said friction element; spring means reacting between said friction element and abutment for pressing said element against said side frame to yieldingly oppose lateral motion of said side frame and provide frictional contact between said friction element and said side frame; and a guideway on said bolster for said friction element having guide surfaces extending lengthwise of the bolster engaging said lengthwise extending portion of said element at the top, bottom, and opposite sides to restrict the same to movement lengthwise of said bolster.

6. In a railway car truck, the combination with truck side frames, a truck bolster, and springs supporting said bolster on the side frames; of vertically spaced, horizontally disposed guides on one side of said bolster at one end thereof, said guides extending lengthwise of the bolster; a friction element having a portion thereof extending lengthwise of the bolster and guided for lengthwise movement between said guides, said element having a friction surface at right angles to the length of the bolster bearing on the side frame; a laterally extending spring abutment projecting from said side of the bolster and aligned with said friction element; and a spring under predetermined compression interposed between said friction element and said spring abutment.

GEORGE E. DATH.

REFERENCES CITED

The following references are of record in the file of this patent:

UNITED STATES PATENTS

| Number | Name | Date |
|---|---|---|
| 2,295,553 | Cottrell | Sept. 15, 1942 |
| 2,338,857 | Light | Jan. 11, 1944 |